US012254818B2

(12) United States Patent
Momose

(10) Patent No.: US 12,254,818 B2
(45) **Date of Patent: *Mar. 18, 2025**

(54) ELECTRO-OPTICAL DEVICE AND ELECTRONIC APPARATUS

(71) Applicant: SEIKO EPSON CORPORATION, Tokyo (JP)

(72) Inventor: Yoichi Momose, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,499

(22) Filed: Jul. 26, 2023

(65) Prior Publication Data

US 2023/0368728 A1 Nov. 16, 2023

Related U.S. Application Data

(63) Continuation of application No. 17/949,786, filed on Sep. 21, 2022, now Pat. No. 11,749,183.

(30) Foreign Application Priority Data

Sep. 22, 2021 (JP) ................................ 2021-153937

(51) Int. Cl.
*G09G 3/32* (2016.01)

(52) U.S. Cl.
CPC ........... *G09G 3/32* (2013.01); *G09G 2310/08* (2013.01)

(58) Field of Classification Search
CPC ............................. G09G 2310/08; G09G 3/32
See application file for complete search history.

(56) References Cited

U.S. PATENT DOCUMENTS

| | | | |
|---|---|---|---|
| 2005/0007361 | A1 | 1/2005 | Fujikura et al. |
| 2005/0035981 | A1 | 2/2005 | Ozaki |
| 2007/0290954 | A1 | 12/2007 | Miyazawa |
| 2011/0025586 | A1 | 2/2011 | Lee |
| 2012/0293479 | A1 | 11/2012 | Han |
| 2018/0053470 | A1 | 2/2018 | Morita et al. |
| 2020/0327835 | A1 | 10/2020 | Kawashima et al. |
| 2021/0166627 | A1 | 6/2021 | Xiao et al. |

FOREIGN PATENT DOCUMENTS

| | | | |
|---|---|---|---|
| JP | 2005-4189 | A | 1/2005 |
| JP | 2007-334178 | A | 12/2007 |
| JP | 2011-34038 | A | 2/2011 |
| JP | 2018-28590 | A | 2/2018 |
| JP | WO2019/092549 | A1 | 12/2020 |

OTHER PUBLICATIONS

Apr. 26, 2023 Noticee of Allowance issued in U.S. Appl. No. 17/949,786.

*Primary Examiner* — Muhammad N Edun
(74) *Attorney, Agent, or Firm* — Oliff PLC

(57) ABSTRACT

In an odd frame, a plurality of scanning lines are selected sequentially, and in one pixel circuit, when a scanning line corresponding to the one pixel circuit is selected, a first selector electrically couples one end of a first capacitance element to a data line, and a second selector electrically couples one end of a second capacitance element to the gate node of a transistor. In an even frame, the plurality of scanning lines are selected sequentially, and when the scanning line is selected, the first selector electrically couples one end of the second capacitance element to the data line, and the second selector electrically couples one end of the first capacitance element to the gate node.

7 Claims, 15 Drawing Sheets

ELECTRO-OPTICAL DEVICE AND ELECTRONIC APPARATUS

The present application is a continuation of application Ser. No. 17/949,786 filed Sep. 21, 2022, which claims priority to JP Application Serial Number 2021-153937, filed Sep. 22, 2021, the disclosure of each of which is hereby incorporated by reference herein in its entirety.

BACKGROUND

1. Technical Field

The present disclosure relates to an electro-optical device and an electronic apparatus.

2. Related Art

Electro-optical devices that use, for example, an OLED as a light-emitting element are known. OLED is an abbreviation for organic light-emitting diode. In such an electro-optical device, a pixel circuit including a transistor for causing current to flow to the light-emitting element and the like is provided corresponding to a pixel of the display image. The transistor supplies current corresponding to the gray scale level to the light-emitting element. This causes the light-emitting element to emit light at brightness corresponding to the current.

For examples of techniques for driving such a light-emitting element, for example, as described in JP-A-2018-28590 and JP-A-2011-34038, a technique is known in which after data signals are sequentially written in one frame period, light-emitting elements are caused to simultaneously emit light.

However, in JP-A-2018-28590 and JP-A-2011-34038, the operations from the line-sequential writing of data signals to the simultaneous light emission of light-emitting elements need to be executed in the limited time of one frame period. Accordingly, the line-sequential writing must be accelerated. Otherwise, no sufficient light emission period can be secured, and thus the display image is darkened.

SUMMARY

An electro-optical device according to an aspect of the present disclosure includes a plurality of pixel circuits provided corresponding to intersections between a data line and a plurality of scanning lines, each of the plurality of pixel circuits including a first selector, a second selector, a first capacitance element, a second capacitance element, a drive transistor, and a light-emitting element, the drive transistor being configured to supply current corresponding to a voltage of a gate node to the light-emitting element, wherein in a first frame, the plurality of scanning lines are selected sequentially, the first selector in one pixel circuit of the plurality of pixel circuits electrically couples, if one scanning line corresponding to the one pixel circuit is selected, one end of the first capacitance element to the data line, and the second selector in the one pixel circuit electrically couples one end of the second capacitance element to the gate node, and in a second frame different from the first frame, the plurality of scanning lines are selected sequentially, the first selector in the one pixel circuit electrically couples, if the one scanning line is selected, one end of the second capacitance element to the data line, and the second selector in the one pixel circuit electrically couples one end of the first capacitance element to the gate node.

DESCRIPTION OF EXEMPLARY EMBODIMENTS

Hereinafter, electro-optical devices according to embodiments of the present disclosure will be described with reference to the accompanying drawings.

Note that in each figure, the size and the scale of each part is varied from the actual size and the actual scale as appropriate. Furthermore, embodiments described below are suitable specific examples, and thus various technically preferable limitations are applied thereto. However, the scope of the present disclosure is not limited to these embodiments unless it is specifically stated in the following description to limit the present disclosure.

First Embodiment

Figure 1:
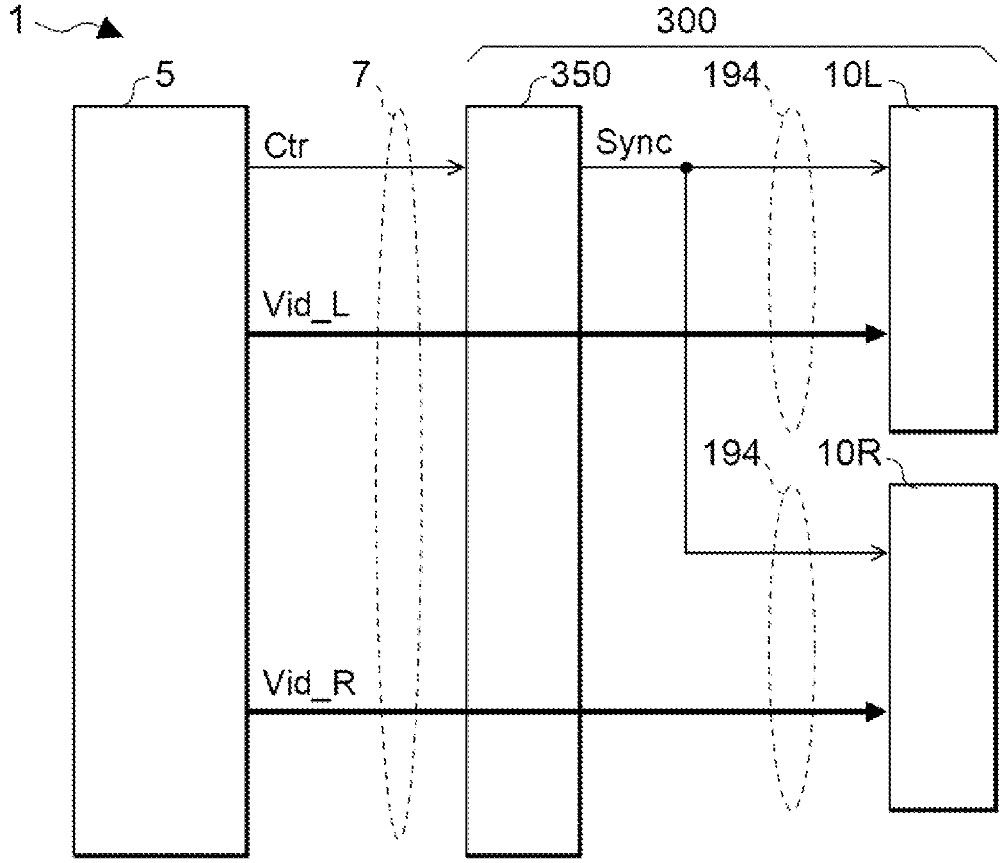
FIG. 1 is a block diagram of a head-mounted display to which an electro-optical device according to a first embodiment is applied.

FIG. 1 is a block diagram illustrating a configuration of a head-mounted display system 1, which is an electronic apparatus to which an electro-optical device according to a first embodiment is applied. As illustrated in this figure, the head-mounted display system 1 includes a main controller 5 and a headset 300. The headset 300 includes electro-optical devices 10L and 10R and a timing controller 350.

The electro-optical device 10L is for the left eye, and the electro-optical device 10R is for the right eye. The electro-optical devices 10L and 10R are each a micro display that displays a color image. In the electro-optical devices 10L and 10R, a plurality of pixel circuits and a drive circuit that drives the pixel circuits are formed at a semiconductor substrate. The semiconductor substrate is typically a silicon substrate, but may be other semiconductor substrates.

The main controller 5 outputs video data Vid_L that represents the video made visible to the left eye, video data Vid_R that represents the video made visible to the right eye, and control signals Ctr. The video data Vid_L and Vid_R specify the gray scale levels of the pixels in the video to be displayed, for example, in eight bits.

The timing controller 350 receives control signals Ctr and video data Vid_L and Vid_R from the main controller 5, and generates timing signals for driving electro-optical devices 10L and 10R based on received signals. Note that timing signals Sync are signals for vertical scanning and horizontal scanning of the electro-optical devices 10L and 10R. Specifically, examples of timing signals Sync include a vertical synchronization signal, a horizontal synchronization signal, a clock signal, and the like. Of these, the vertical synchronization signal specifies the start of vertical scanning in the electro-optical devices 10L and 10R, and the horizontal synchronization signal specifies the start of horizontal scanning in the electro-optical devices 10L and 10R.

Furthermore, the clock signal is used as a synchronization signal when the video data Vid_L is transferred to the electro-optical device 10L, and the video data Vid_R is transferred to the electro-optical device 10R.

Furthermore, the timing controller 350 transfers the received video data Vid_L to the electro-optical device 10L, and transfers the received video data Vid_R to the electro-optical device 10R.

Figure 2:
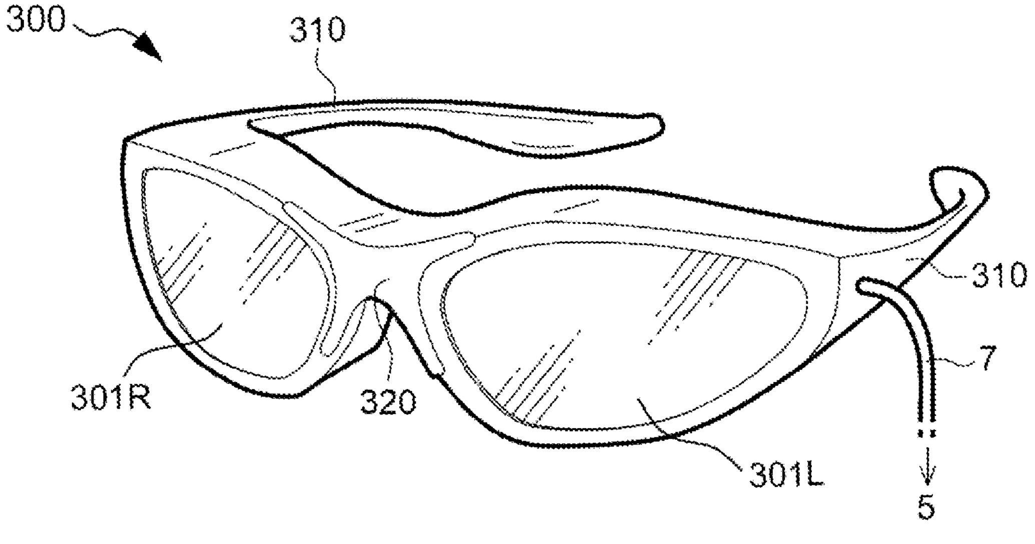
FIG. 2 is a perspective view illustrating a configuration of the head-mounted display.
Figure 3:
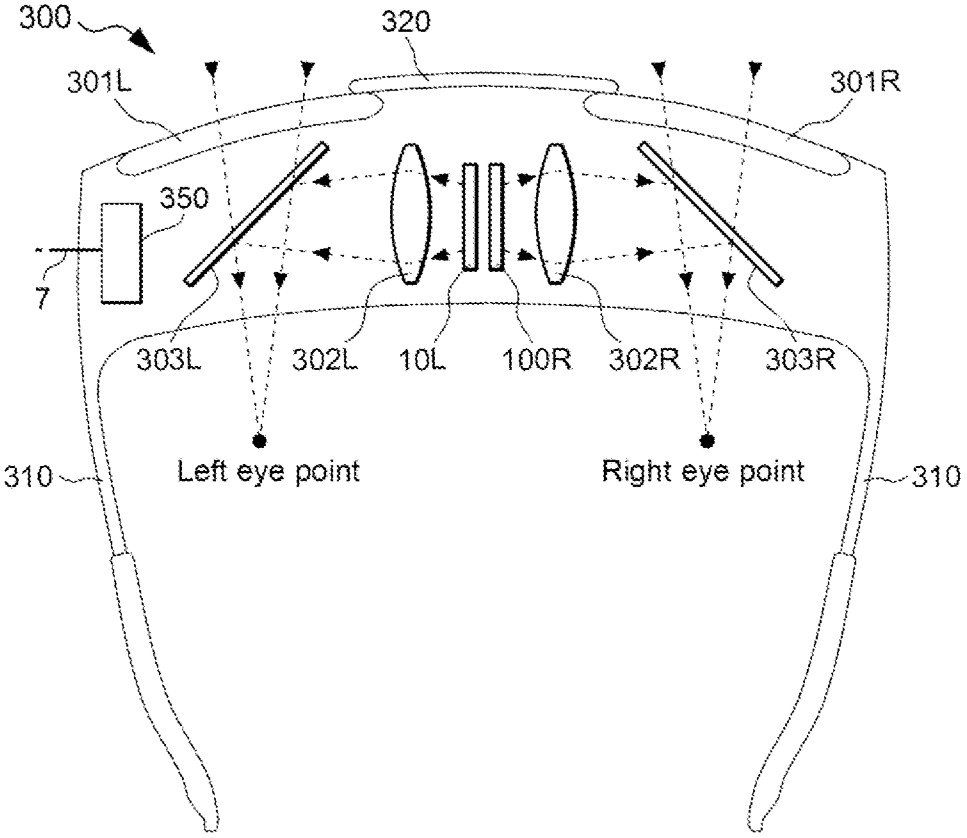
FIG. 3 is a view illustrating an optical configuration of the head-mounted display.

FIG. 2 is a perspective view illustrating a headset of a head-mounted display system. FIG. 3 is a view illustrating an optical configuration of the headset.

As illustrated in FIG. 2, the headset 300 includes, as in the case of typical eyeglasses, temples 310, a bridge 320, and lenses 301L and 301R in terms of appearance. Furthermore, as illustrated in FIG. 3, the headset 300 is provided with the electro-optical device 10L for the left eye and the electro-optical device 10R for the right eye in the vicinity of the bridge 320 and on the back side (the lower side in the figure) of the lenses 301L and 301R. Note that the timing controller 350 is built in the headset 300, and generates timing signals Sync for driving the electro-optical devices 10L and 10R described above based on signals received from the main controller 5 via a cable 7.

An image display surface of the electro-optical device 10L is disposed so as to be on the left side in FIG. 3. This causes the display image by the electro-optical device 10L to be emitted in the 9-o'clock direction in the figure via an optical lens 302L. A half mirror 303L reflects the display image by the electro-optical device 10L to the 6-o'clock direction, while transmitting light incident from the 12-o'clock direction. An image display surface of the electro-optical device 10R is disposed so as to be on the right side as opposed to the electro-optical device 10L. This causes the display image by the electro-optical device 10R to be emitted in the 3-o'clock direction in the figure via an optical lens 302R. A half mirror 303R reflects the display image by the electro-optical device 10R to the 6-o'clock direction, while transmitting light incident from the 12-o'clock direction.

In this configuration, the user wearing the headset 300 can observe the display images by the electro-optical devices 10L and 10R overlaid with the outside scene in a see-through state.

Furthermore, in the headset 300, of a parallax image for both eyes, displaying the image for the left eye on the electro-optical device 10L and displaying the image for the right eye on the electro-optical device 10R can cause the wearer to perceive as if the displayed image has depth or the stereoscopic effect. However, when it is not required to cause the user to perceive the stereoscopic effect or the like, the video data Vid_L and Vid_R may be communized so that the same video is displayed thereby.

Note that the configurations of the electro-optical devices 10L and 10R are identical to each other. Thus, in the following, the electro-optical devices 10L and 10R are not particularly distinguished and are simply denoted by the reference sign of 10, with the suffixes L and R being omitted. The video data Vid_L and Vid_R are also simply denoted as video data Vid.

Figure 4:
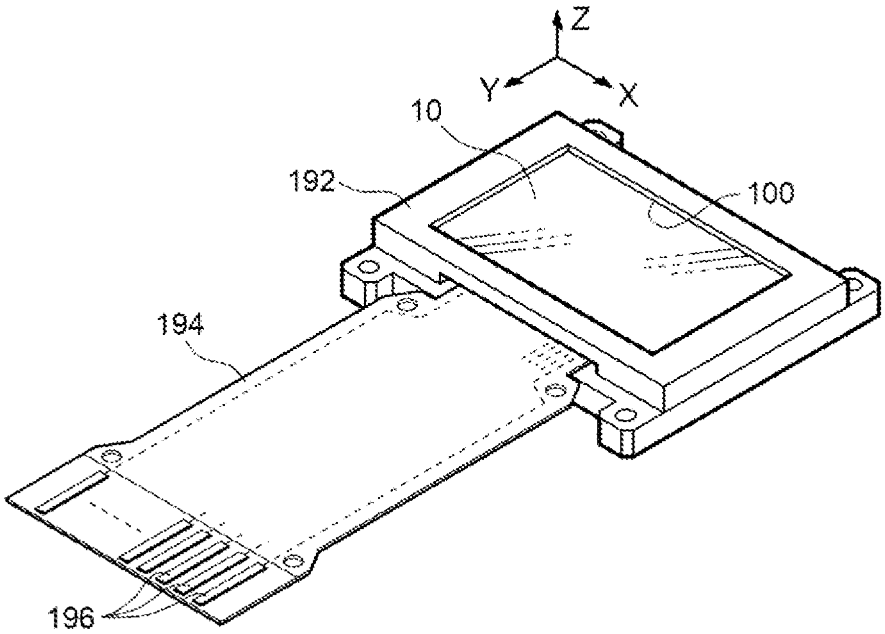
FIG. 4 is a perspective view of an electro-optical device.
Figure 5:
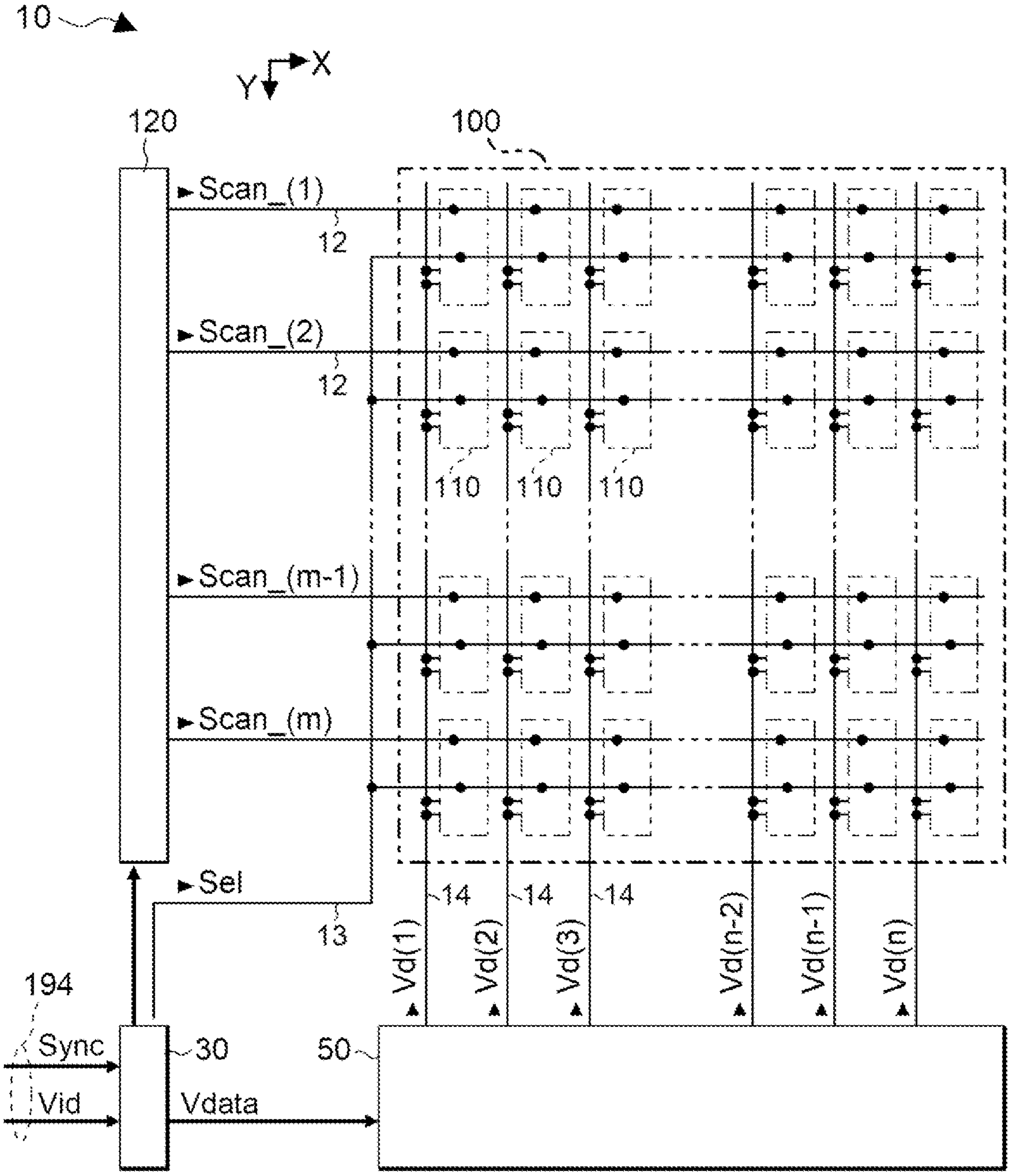
FIG. 5 is a block diagram illustrating an electrical configuration of the electro-optical device.

FIG. 4 is a perspective view illustrating the electro-optical device 10. FIG. 5 is a block diagram illustrating the electrical configuration of the electro-optical device 10. The electro-optical device 10 includes a light-emitting element formed on a semiconductor substrate or on a glass substrate. In the present embodiment, an OLED is used as an example of the light-emitting element.

As illustrated in FIG. 4, the electro-optical device 10 is housed in a frame-shaped case 192 that opens at a display region 100. The electro-optical device 10 is coupled to one end of an FPC substrate 194. Note that FPC is an abbreviation for flexible printed circuit.

A plurality of terminals 196 coupled to the timing controller 350 are provided at the other end of the FPC substrate 194. As illustrated in FIG. 5, video data Vid, timing signals Sync, and the like are supplied to the electro-optical device 10 via the FPC substrate 194.

Note that in the figure, the X direction indicates the extending direction of scanning lines in the electro-optical device 10, and the Y direction indicates the extending direction of data lines. A two-dimensional plane defined by the X direction and the Y direction is the substrate surface of the semiconductor substrate. The Z direction is perpendicular to the X direction and the Y direction. The Z direction indicates the emission direction of light emitted from the light-emitting element.

As illustrated in FIG. 5, the electro-optical device 10 is largely divided into a control circuit 30, a data signal output circuit 50, a display region 100, and a scanning line drive circuit 120.

At the display region 100, m rows of scanning lines 12 are provided along the X direction in the figure, and n columns of data lines 14 are provided along the Y direction in the figure so as to be electrically insulated from the scanning lines. Note that m and n are each an integer greater than or equal to 2.

In the display region 100, pixel circuits 110 are provided corresponding to intersections between the m rows of scanning lines 12 and the n columns of data lines 14. Accordingly, the pixel circuits 110 are arranged in a matrix pattern including m rows vertically and n columns horizontally in the figure. To distinguish the rows from each other in the matrix pattern, the rows may be referred to, sequentially from the top in the figure, as the first, second, third, . . . , (m−1)th, and m-th row. Similarly, to distinguish the columns from each other in the matrix, the columns may be referred to, sequentially from the left in the figure, as the first, second, third, . . . , (n−1)th, and n-th column.

Note that an integer i of not less than 1 and not greater than m is used for generalized description of the scanning lines 12. Similarly, an integer j of not less than 1 and not greater than n is used for generalized description of the data lines 14.

The control circuit 30 controls each part based on video data Vid supplied from the main controller 5 and timing signals Sync supplied from the timing controller 350. As described above, the video data Vid specifies the gray scale levels of the pixels, for example, in 8 bits. However, the brightness characteristics indicated by the gray scale level of a pixel in the image to be displayed and the luminance of the pixel circuit 110 corresponding to the pixel, specifically, the luminance characteristics of the OLED included in the pixel circuit 110 do not match.

Accordingly, to cause the OLED to emit light at luminance corresponding to the gray scale level specified in the video data Vid, the control circuit 30 upconverts the 8 bits of the video data Vid to, for example, 10 bits in the present embodiment, and outputs the same as video data Vdata that specifies the luminance of the OLED.

In such upconversion, a lookup table is used that stores in advance the correspondence relationship between the 8 bits of the video data Vid serving as input and the 10 bits of video data Vdata serving as output.

Furthermore, the control circuit 30 generates various control signals, of which the details will be described later, to control each part.

The scanning line drive circuit 120 is a circuit for driving pixel circuits 110 arranged in m rows and n columns row by row under the control of the control circuit 30. The scanning line drive circuit 120 sequentially supplies scanning signals Scan (1), Scan (2), . . . , Scan (m−1), and Scan (m) to the scanning lines 12 at the first, second, third, . . . , (m−1)th, and m-th rows, respectively. Typically, the scanning signal supplied to the scanning line 12 at the i-th row is denoted as Scan_(i).

Note that in FIG. 5, to avoid complication of the drawing, the number of scanning lines 12 per one line is one. In reality, however, the number of scanning lines per one line is "two". The scanning signals supplied to the two scanning lines 12 corresponding to the i-th row are Scan_a (i) and Scan_b (i).

The data signal output circuit 50 is a circuit that outputs a data signal of a voltage corresponding to luminance toward the pixel circuit 110 located at a row selected by the scanning line drive circuit 120.

Specifically, the data signal output circuit 50 latches the video data Vdata for one row supplied from the control circuit 30, converts the latched video data Vdata for one row into an analog data signal, and outputs the same as a data signal to the corresponding data line 14.

Note that the potential of the data lines 14 at the first, second, . . . , (n−1)th, and n-th column is sequentially denoted as Vd(1), Vd(2), . . . , Vd(n−1), and Vd(n). Typically, the potential of the data line 14 at the j-th column is denoted as Vd(j).

Note that in the present description, the L level (ground potential) as a logical level serves as reference for zero voltage. However, except for the voltage (threshold voltage) between two points, the terms of potential and voltage are not used strictly differently in the present description. Furthermore, in the present description, a power supply refers to a substantially temporally constant voltage or potential.

Figure 6:
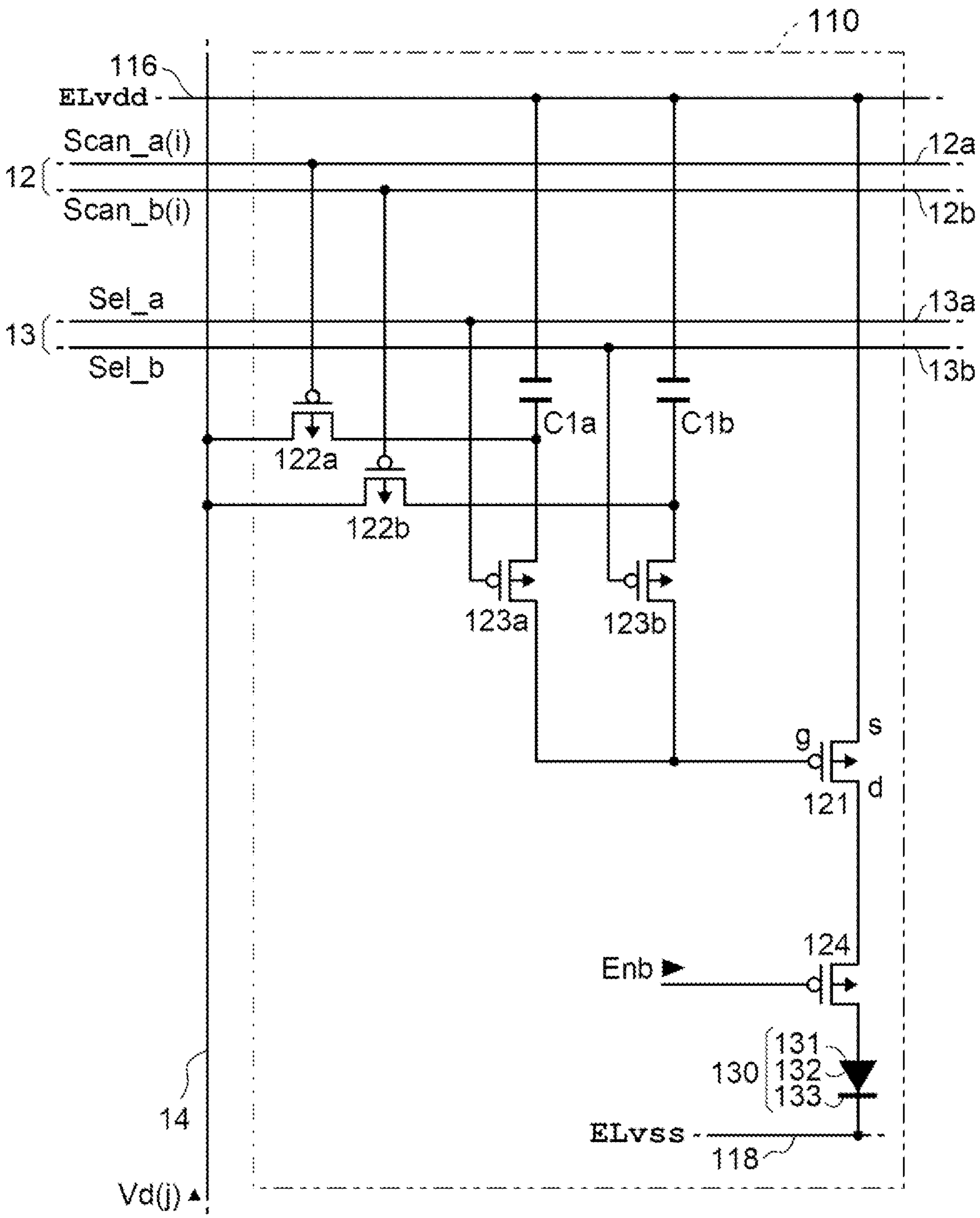
FIG. 6 is a diagram illustrating a pixel circuit in the electro-optical device.

FIG. 6 is a diagram illustrating a pixel circuit 110. The pixel circuits 110 arranged in m rows and n columns are electrically identical to each other. Accordingly, the pixel circuits 110 will be described using the pixel circuit 110 located at the i-th row and the j-th column as a representative thereof.

As illustrated in the figure, the pixel circuit 110 includes an OLED 130, p-channel MOS type transistors 121, 122*a*, 122*b*, 123*a*, 123*b*, and 124, and capacitance elements C1*a* and C1*b*. Note that MOS is an abbreviation for metal-oxide-semiconductor field-effect transistor.

To the pixel circuit 110 at the i-th row, the scanning signal Scan_a(i) is supplied, of the two scanning lines 12 corresponding to the i-th row, via one scanning line 12*a*, and the scanning signal Scan_b(i) is supplied via the other scanning line 12*b*.

Furthermore, selection signals Sel_a and Sel_b and a control signal Enb are commonly supplied from the control circuit 30 to all of the pixel circuits 110 at the first to m-th rows.

The OLED 130 is a light-emitting element in which a light-emitting function layer 132 is sandwiched between a pixel electrode 131 and a common electrode 133. The pixel electrode 131 functions as an anode, and the common electrode 133 functions as a cathode. Note that the common electrode 133 has light reflectivity and optical transparency. When current flows from the anode to the cathode in the OLED 130, holes injected from the anode and electrons injected from the cathode are recombined at the light emission function layer 132 to generate excitons, generating white light.

In the case of color display, the generated white light resonates, for example, in an optical resonator (not illustrated) formed of a reflection layer and a semi-reflective semi-transparent layer, and is emitted at a resonance wavelength set corresponding to any of the colors of red (R), green (G), and blue (B). A color filter corresponding to the color is provided on the light emission side of the optical resonator. Therefore, the emitted light from the OLED 130 is colored by the optical resonator and the color filter before being visually recognized by the observer. Note that the optical resonator is not illustrated. Furthermore, when the electro-optical device 10 displays a single color image with only light and shade, the color filter described above is omitted.

In the pixel circuit 110 at the i-th row and j-th column, for the transistor 122*a*, the source node is coupled to the data line 14 at the j-th column, the drain node is coupled to one end of the capacitance element C1*a* and the source node of the transistor 123*a*, and the gate node is coupled to the scanning line 12*a*. For the transistor 122*b*, the source node is coupled to the data line 14 at the j-th column, the drain node is coupled to one end of the capacitance element C1*b* and the source node of the transistor 123*b*, and the gate node is coupled to the scanning line 12*b*. The other end of the capacitance element C1*a* and the other end of the capacitance element C1*b* are coupled to power supply wiring 116 through which the higher power supply potential Elvdd is supplied.

For the transistor 123*a*, the gate node is coupled to a control line 13*a* through which the selection signal Sel_a is supplied. For the transistor 123*b*, the gate node is coupled to a control line 13*b* through which the selection signal Sel_b is supplied. The drain node of the transistor 123*a* and the drain node of the transistor 123*b* are coupled to the gate node g of the transistor 121.

For the transistor 121, the source node s is coupled to the power source wiring 116, and the drain node d is coupled to the source node of the transistor 124. For the transistor 124, the control signal Enb is supplied to the gate node, and the drain node is coupled to the pixel electrode 131 of the OLED 130. Note that in the OLED 130, the lower power supply potential Elvss is supplied to the common electrode 133 via power supply wiring 118.

Note that in the present description, "electrically coupled" or simply "coupled" means a direct or indirect coupling or bonding between two or more elements. This includes, for example, two or more elements being coupled to each other via a different wiring layer or a contact hole even if not directly.

Figure 7:
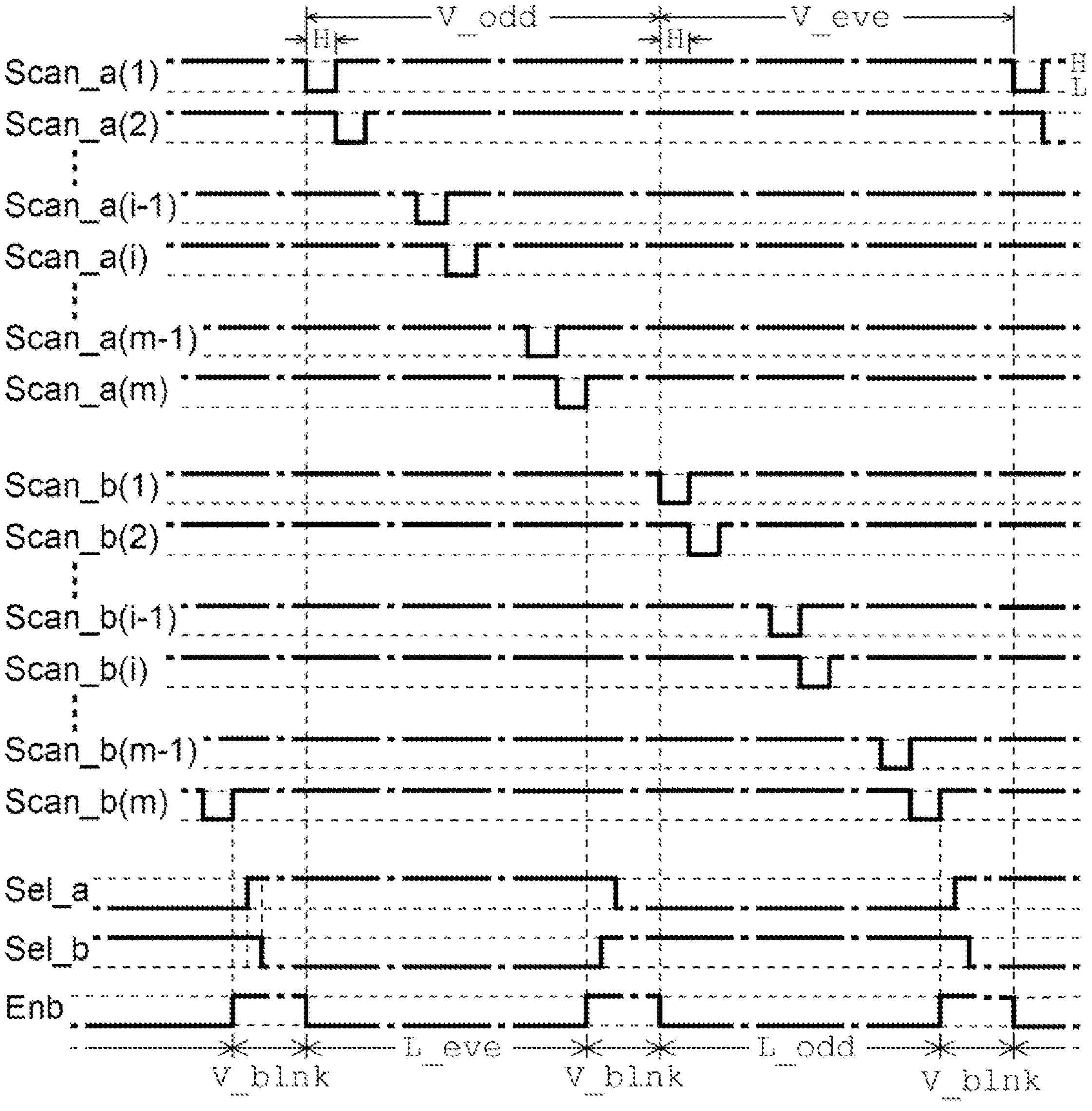
FIG. 7 is a timing chart illustrating an operation of the electro-optical device.

FIG. 7 is a timing chart for describing an operation of the electro-optical device 10.

The operation of the electro-optical device 10 is divided into that in odd frames V_odd and that in even frames V_eve. Note that odd frames V_odd and even frames V_eve are merely for distinguishing consecutive frames for convenience. In the present description, a frame refers to a period required to display a single frame of the image specified by the video data Vid. If the period length of one frame is the same as the vertical synchronization period, for example, if the frequency of the vertical synchronization signal included in the timing signal Sync is 60 Hz, then the period length of one frame is 16.7 milliseconds, which corresponds to one cycle of the vertical synchronization signal.

In the odd frame V_odd, scanning signals Scan_a(1), Scan_a(2), . . . , Scan_a(m−1), and Scan_a(m) are sequentially and exclusively brought to the L level in each horizontal scanning period H. Furthermore, in the even frame V_eve, scanning signals Scan_b(1), Scan_b(2), . . . , Scan_b (m−1), and Scan_b(m) are sequentially and exclusively brought to the L level in each horizontal scanning period H.

The period after the scanning signal Scan_a(m) changes to the H level until the scanning signal Scan_b(1) changes to the L level, and the period after the scanning signal Scan_b (m) changes to the H level until the scanning signal Scan_a (1) changes to the L level represent vertical scanning blanking periods V_blnk.

In the present embodiment, the control signal Enb is at the H level in the vertical scanning blanking period V_blnk.

Note that the period after the scanning signal Scan_a(1) changes to the L level until the scanning signal Scan_a(m) changes to the H level in the odd frame V_odd, and the period after the scanning signal Scan_b(1) changes to the L level until the scanning signal Scan_b(m) changes to the H level in the even frame V_eve are sometimes referred to as horizontal effective scanning periods. In the present embodiment, for convenience, the horizontal effective scanning period in the odd frame V_odd is caused to coincide with the light emission period L_eve, and the horizontal effective scanning period in the even frame V_eve is caused to coincide with the light emission period L_odd.

In the present embodiment, the control signal Enb is at the L level in the light emission periods L_eve and L_odd.

In the vertical scanning blanking period V_blnk before the odd frame V_odd starts, the selection signal Sel_a changes from the L level to the H level earlier in time, and the selection signal Sel_b changes from the H level to the L level later in time. Furthermore, in the vertical scanning blanking period V_blnk before the even frame V_eve starts, the selection signal Sel_b changes from the L level to the H level earlier in time, and the selection signal Sel_a changes from the H level to the L level later in time.

That is, the selection signal Sel_a has a phase shifted by 180 degrees from that of the selection signal Sel_b.

First, the operation of the odd frame V_odd will be described. When the scanning signal Scan_a(i) is brought to the L level in the odd frame V_odd, in the pixel circuit 110 at the i-th row and j-th column, the transistor 122*a* is brought into the ON state. In the period in which the scanning signal Scan_a(i) is brought to the L level, the scanning signal Scan_b(i) is at the H level, and thus in the pixel circuit 110 at the i-th row and the j-th column, the transistor 122*b* is in the OFF state.

In the present description, the "ON state" of a switching element or a transistor refers to a low impedance state caused when the conduction between both ends of the switching element or between the source node and the drain node of the transistor is closed. Furthermore, the "OFF state" of a switching element or a transistor refers to a high impedance state caused when the conduction between both ends of the switching element or between the source node and the drain node is open.

In the period in which the scanning signal Scan_a (i) is brought to the L level in the odd frame V_odd, the data signal output circuit 50 converts the gray scale levels, indicated by the video data Vdata, of the pixels at the i-th row and the first column to the i-th row and the n-th column to the potentials Vd(1) to Vd(n) that are analog, and outputs the same to the data lines 14 at the first to n-th column as data signals. Referring to the j-th column, the data signal output circuit 50 converts the gray scale level of the pixel at the i-th row and the j-th column to the potential Vd(j) of an analog signal, and outputs the same to the data line 14 at the j-th column as a data signal.

The data signal of the potential Vd(j) is held in the capacitance element C1*a* via the data line 14 at the j-th column and the transistor 122*a* in the pixel circuit 110 at the i-th row and the j-th column in this order.

Note that although the pixel circuit 110 at the i-th row and the j-th column has been described here, the data signal is held in the capacitance element C1*a* even in pixel circuits 110 at the i-th row and columns other than the j-th column.

Furthermore, in the odd frame V_odd, even at rows other than the i-th row, the scanning signals Scan_a(1) to Scan_a (m) are brought to the L level sequentially, whereby a data signal of the potential corresponding to the gray scale level of the pixel is held in the capacitance element C1*a*.

In the light emission period L_eve of the odd frame V_odd, the selection signal Sel_a is at the H level, and thus the transistor 123*a* is brought into the OFF state in all of the pixel circuits 110. Furthermore, in the light emission period L_eve, the selection signal Sel_b is at the L level, and thus the transistor 123*b* is brought into the ON state in all of the pixel circuits 110.

Accordingly, in all of the pixel circuits 110, one end of the capacitance element C1*b* is electrically coupled to the gate node g of the transistor 121 via the transistor 123*b*, and thus the voltage held in the capacitance element C1*b* is applied between the gate node and the source node in the transistor 121.

Furthermore, in the light emission period L_eve, the control signal Enb is at the L level, and thus the transistor 124 is brought into the ON state.

Therefore, in all of the pixel circuits 110 in the light emission period L_eve, the transistor 121 causes current corresponding to the voltage between the gate node and the source node, that is, the gray scale level of the pixel to flow to the OLED 130.

The voltage held in the capacitance element C1*b* in the light emission period L_eve is based on the data signal supplied via the data line 14 in the even frame V_eve preceding the odd frame V_odd. Therefore, in the light emission period L_eve of the odd frame V_odd, the OLED 130 in all of the pixel circuits 110 will emit light at luminance corresponding to the data signal supplied in the preceding even frame V_eve.

Next, the operation of the even frame V_eve will be described. When the scanning signal Scan_b(i) is brought to the L level in the even frame V_eve, in the pixel circuit 110 at the i-th row and the j-th column, the transistor 122*b* is brought into the ON state. In the period in which the scanning signal Scan_b(i) is brought to the L level, the scanning signal Scan_a(i) is at the H level, and thus in the pixel circuit 110 at the i-th row and the j-th column, the transistor 122*a* is in the OFF state.

In the period in which the scanning signal Scan_b (i) is brought to the L level in the even frame V_eve, the data signal output circuit 50 converts the gray scale levels, indicated by the video data Vdata, of the pixels at the i-th row and the first column to the i-th row and the n-th column to the potentials Vd(1) to Vd(n) that are analog, and outputs the same to the data lines 14 at the first to n-th column as data signals. Referring to the jth column, the data signal output circuit 50 converts the gray scale level of the pixel at the ith row and the jth column to the potential Vd(j) of an analog signal, and outputs the same to the data line 14 at the jth column as a data signal.

The data signal of the potential Vd(j) is held in the capacitance element C1*b* via the data line 14 at the j-th column and the transistor 122*b* in the pixel circuit 110 at the i-th row and the j-th column in this order.

Note that although the pixel circuit 110 at the i-th row and the j-th column has been described here, the data signal is held in the capacitance element C1*b* even in pixel circuits 110 at the i-th row and columns other than the j-th column.

Furthermore, in the even frame V_eve, even at rows other than the i-th row, the scanning signals Scan_b(1) to Scan_b (m) are brought to the L level sequentially, whereby a data signal of the potential corresponding to the gray scale level of the pixel is held in the capacitance element C1*b*.

In the light emission period L_eve, the selection signal Sel_b is at the H level, and thus the transistor 123*b* is brought into the OFF state in all of the pixel circuits 110. Furthermore, in the light emission period L_odd, the selection signal Sel_a is at the L level, and thus the transistor 123*a* is brought into the ON state in all of the pixel circuits 110.

Accordingly, in all of the pixel circuits 110, one end of the capacitance element C1*b* is electrically coupled to the gate node g of the transistor 121 via the transistor 123*a*, and thus the voltage held in the capacitance element C1*a* is applied between the gate node and the source node in the transistor 121.

Furthermore, in the light emission period L_odd, the control signal Enb is at the L level, and thus the transistor 124 is brought into the ON state.

In all of the pixel circuits 110 in the light emission period L_odd, the transistor 121 causes current corresponding to the voltage between the gate node and the source node, that is, the gray scale level of the pixel to flow to the OLED 130.

As described above, the voltage held in the capacitance element C1*a* in the light emission period L_odd is based on the data signal supplied via the data line 14 in the preceding odd frame V_odd.

Therefore, in the light emission period L_odd, the OLEDs 130 in all of the pixel circuits 110 will emit light at luminance corresponding to the data signal supplied in the preceding odd frame V_odd.

In the present embodiment, in the odd frame V_odd, the potential of the data signal is sequentially held in the capacitance elements C1*a* from the first row to the m-th row; and in the next even frame V_eve, the control signal Enb is brought to the L level, whereby the OLEDs 130 in all of the pixel circuits 110 from the first row to the m-th row simultaneously emit light.

On the other hand, in the even frame V_eve, the potential of the data signal is sequentially held in the capacitance elements C1*b* from the first row to the m-th row; and in the next odd frame V_odd, the control signal Enb is brought to the L level, whereby the OLEDs 130 in all of the pixel circuits 110 from the first row to the m-th row simultaneously emit light.

In this way, in the present embodiment, the OLEDs 130 in all of the pixel circuits 110 simultaneously emit light in accordance with the voltage held in the immediately preceding frame.

Furthermore, in the present embodiment, high-speed operation is not required in the operation of causing the capacitance elements C1*a* or C1*b* from the first row to the m-th row to hold the potential of the data signal; furthermore, the horizontal effective scanning period can be secured as the light emission period L_eve or L_odd, and thus the display image is not darkened.

Furthermore, according to the present embodiment, when the user wearing the head-mounted display system 1 visually recognizes the display image by the electro-optical device 10 overlaid with the actual scene, the display image can be suppressed from being visually recognized with distortion when the user shakes the head. This point will be described below.

Figure 16A:
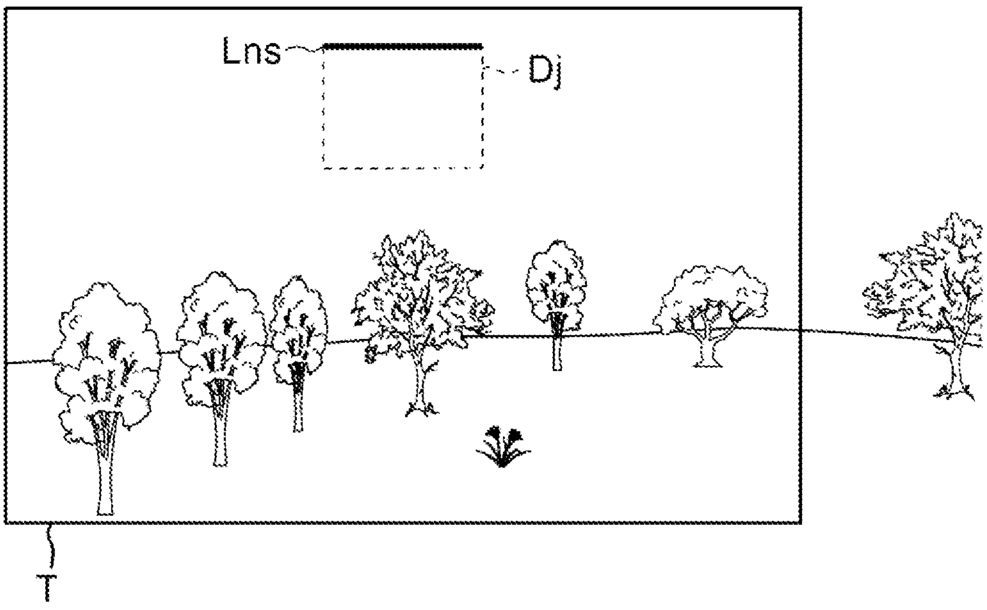
FIG. 16A is a view illustrating display distortion in the electro-optical device.
Figure 16B:
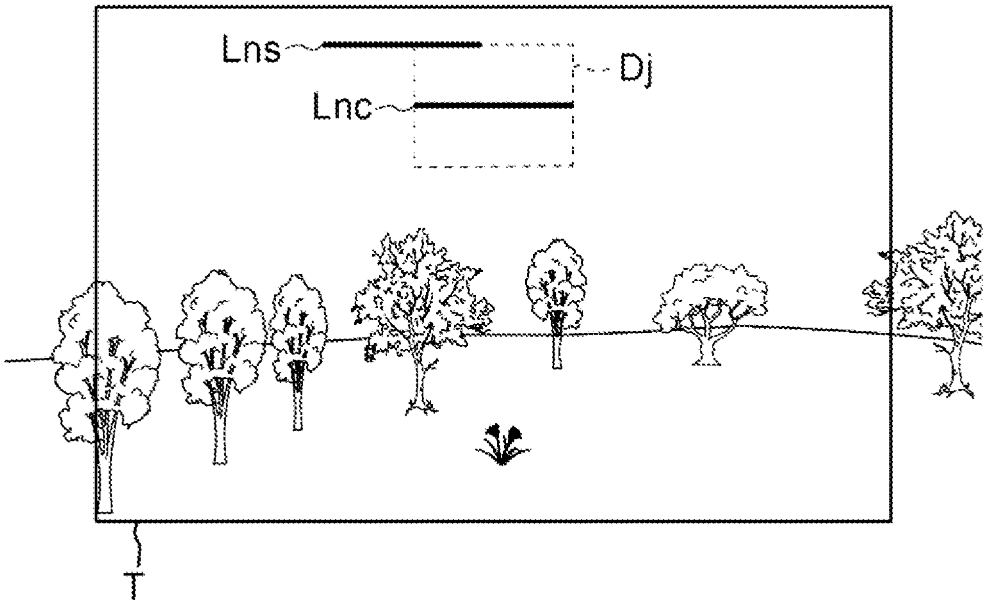
FIG. 16B is a view illustrating display distortion in the electro-optical device.
Figure 16C:
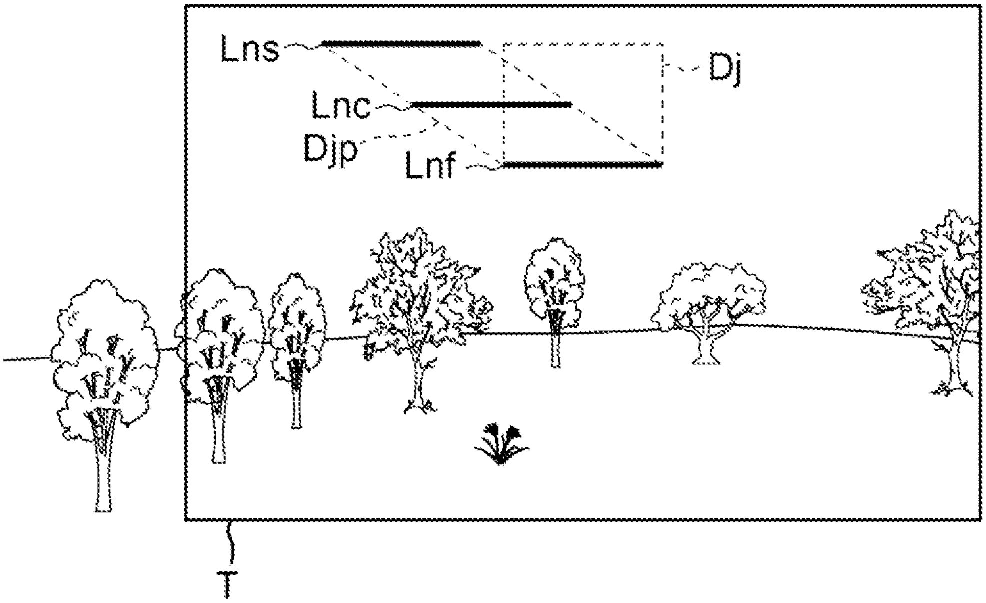
FIG. 16C is a view illustrating display distortion in the electro-optical device.

FIGS. 16A, 16B, and 16C are views for describing that in a configuration in which OLEDs are caused to emit light in a typical line-sequential manner, the display image is visually recognized with distortion. Note that the configuration in which OLEDs are caused to emit light in a line-sequential manner refers to a configuration in which OLEDs are caused to emit light substantially at the same time as capacitance elements are caused to hold the data signal by the selection of a scanning line, that is, a configuration in which OLEDs are caused to emit light scanning line by scanning line (line by line).

In these figures, the frame-shaped T indicates the visual field of the user wearing the headset 300. Suppose that the electro-optical device 10 displays a rectangular object Dj in the visual field T. In this case, as illustrated in FIGS. 16A, 16B, and 16C in this order, when the user shakes the head in the right direction to rapidly move the visual field T, in a configuration in which OLEDs are caused to emit light in a line-sequential manner, the timing of the start of light emission in the object Dj varies from line to line. Specifically, in relation to the scene that relatively moves by the shaking of the head, the line (row) Lns at the upper end in the object Dj starts to emit light first; the line Lnc substantially at the middle starts to emit light later than the line Lns; and the line Lnf at the lower end starts to emit light at last.

In this way, in relation to the relatively moving scene, the lower a line is in the object Dj, the more delayed the start timing of the line is. Thus, the user will visually recognize as if the object Dj displayed in a rectangular shape is distorted like the shape Djp.

In contrast, in the present embodiment, the timing of the start of light emission does not vary from line to line, and the light emission of the OLED 130 is simultaneously executed in all of the pixel circuits 110. Accordingly, in the present embodiment, the display image can be prevented from being visually recognized with distortion when the user shakes the head.

Modified Examples of First Embodiment

For the first embodiment described above, the following modified examples can be carried out.

In the first embodiment, as illustrated in FIG. 7, the scanning signal Scan_b(m) changes to the H level, after which the selection signal Sel_a changes from the L level to the H level, and subsequently the selection signal Sel_b changes from the H level to the L level; and the scanning signal Scan_a(m) changes to the H level, after which the selection signal Sel_b changes from the L level to the H level, and subsequently the selection signal Sel_a changes from the H level to the L level.

Figure 8:
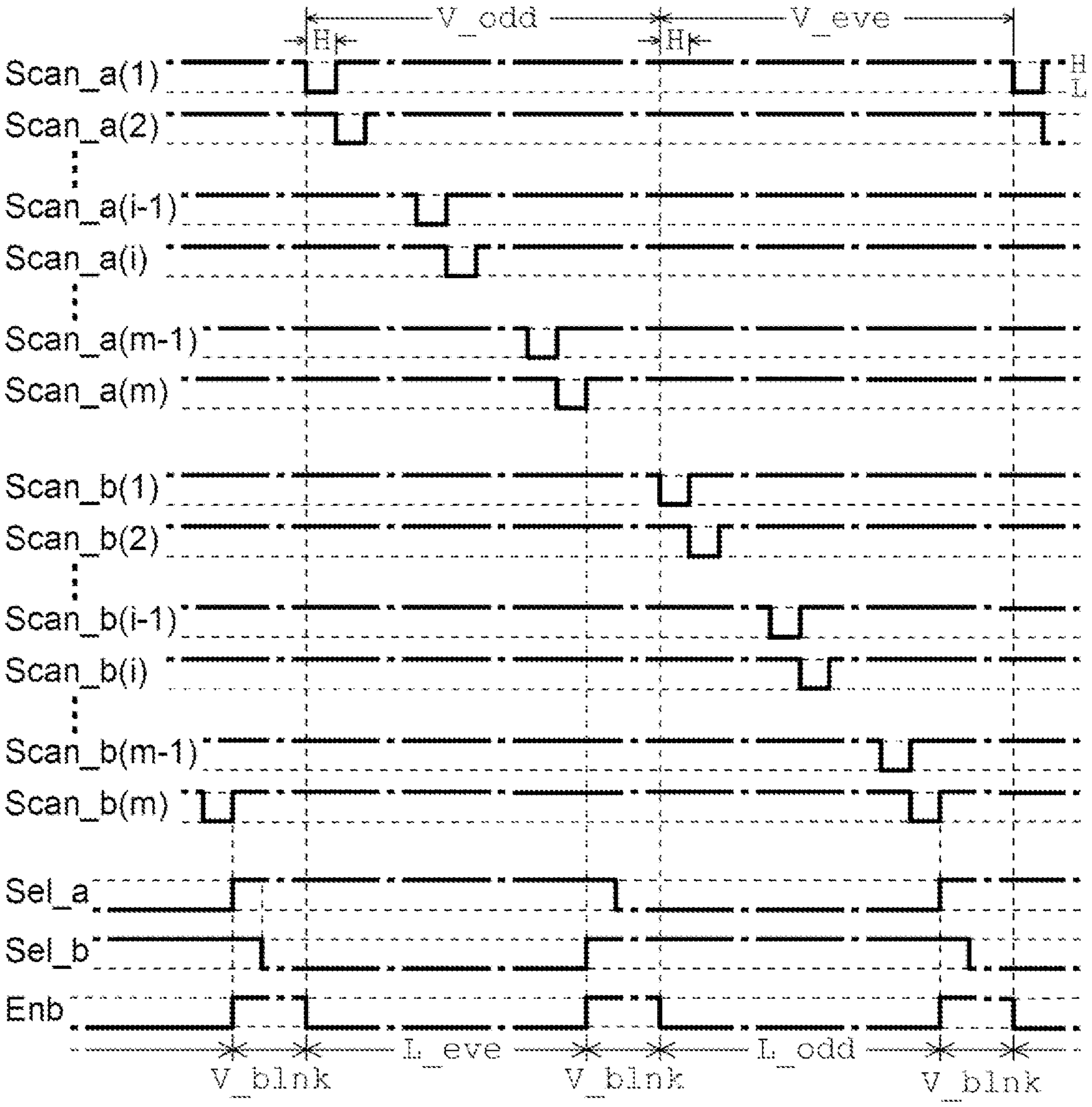
FIG. 8 is a timing chart illustrating an operation of a first modified example of the electro-optical device.

The first embodiment is not limited to this configuration. As illustrated in FIG. 8, the first embodiment may be configured so that the timing at which the scanning signal Scan_b(m) changes to the H level coincides with the timing at which the selection signal Sel_a changes from the L level to the H level, and the timing at which the scanning signal Scan_a(m) changes to the H level coincides with the timing at which the selection signal Sel_b changes from the L level to the H level. That is, the start timing of the vertical scanning blanking period V_blnk may coincide with the timing of disconnecting from the gate node g of the transistor 121 the capacitance element C1*a* or C1*b* that has been coupled thereto until then.

Figure 9:
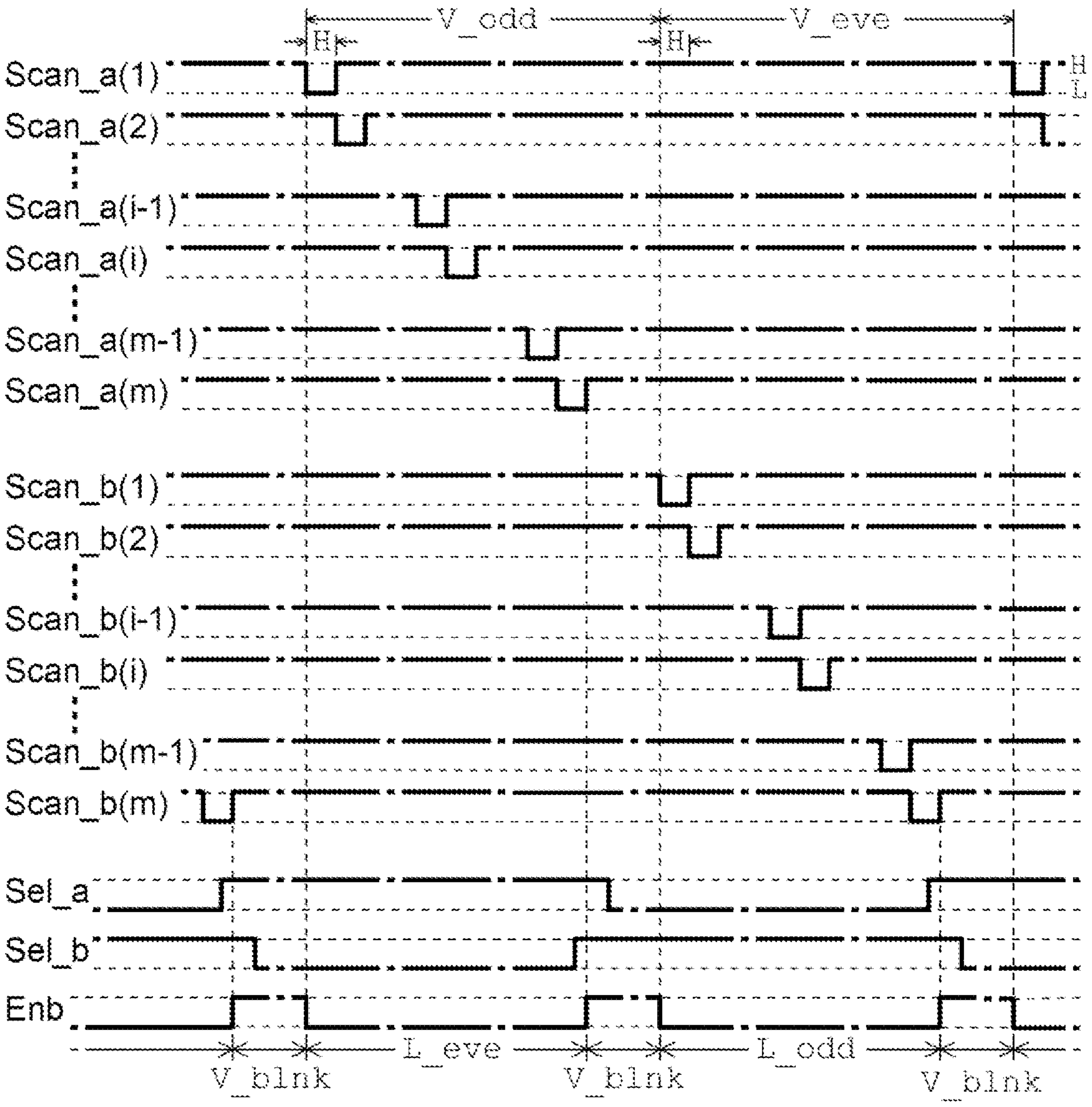
FIG. 9 is a timing chart illustrating an operation of a second modified example of the electro-optical device.

As illustrated in FIG. 9, the selection signal Sel_a or the select signal Sel_b may be changed to the H level before the timing at which the control signal Enb changes to the H level. That is, the capacitance element C1*a* or C1*b* may be disconnected from the gate node g of the transistor 121 before the timing of turning off the OLED 130.

Furthermore, in the first embodiment, the period in which the scanning signals Scan_a(1) to Scan_a(m) are sequentially brought to the L level and the period in which the scanning signals Scan_b(1) to Scan_b(m) are sequentially brought to the L level, that is, the entirety of the horizontal effective scanning periods serves as the light emission period, in which the control signal Enb is brought to the L level, that is, the OLED 130 is caused to emit light.

Figure 10:
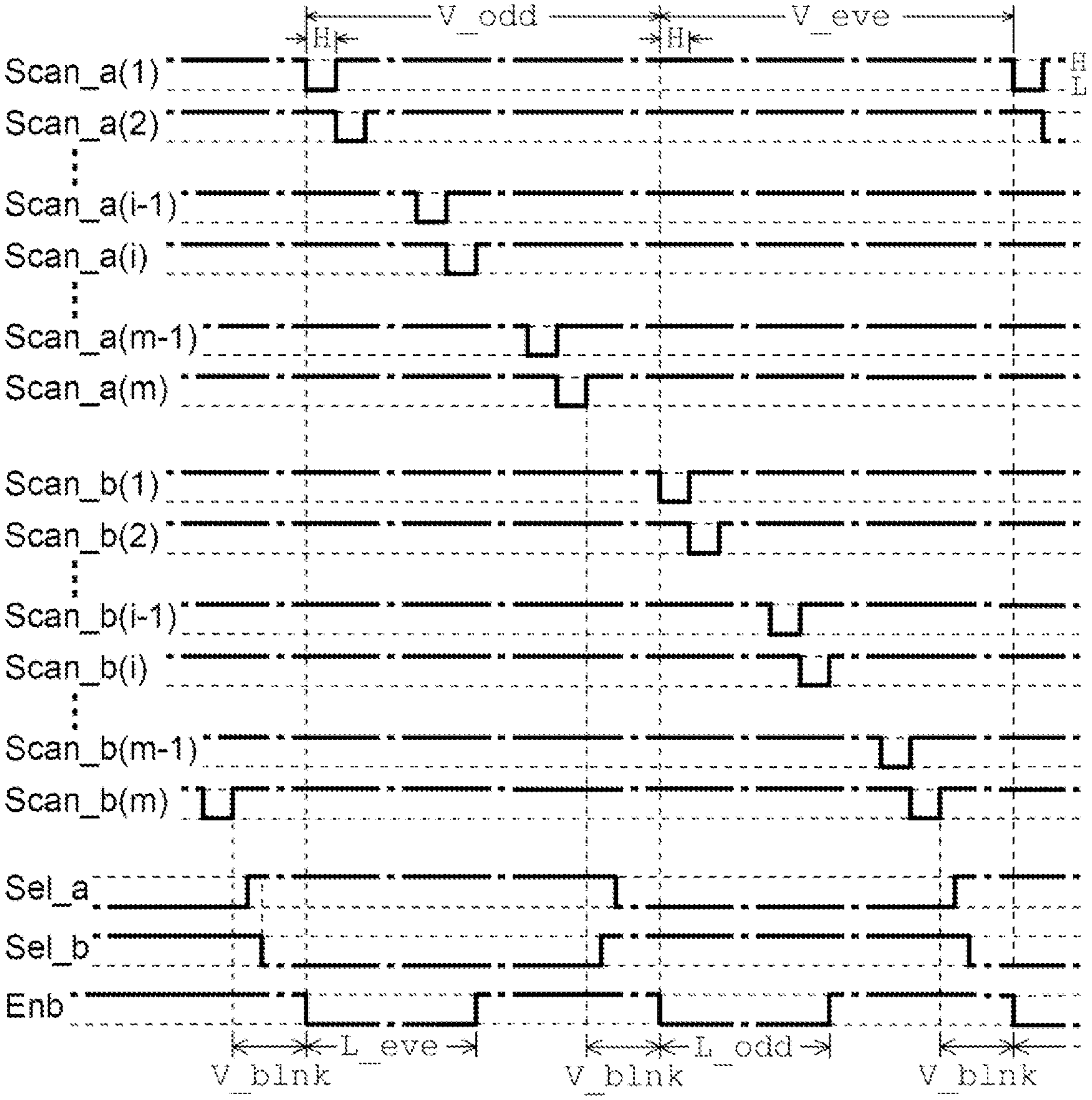
FIG. 10 is a timing chart illustrating an operation of a third modified example of the electro-optical device.

The first embodiment is not limited to this configuration. As illustrated in FIG. 10, the light emission period for which the control signal Enb is brought to the L level may be narrowed to shorten the light emission period of the OLED 130. When the light emission period of the OLED 130 is shortened by such a configuration, the display characteristics in the electro-optical device 10 are brought closer to the so-called impulse response, and thus a sense of afterimage in the display of moving image is reduced. Furthermore, the pixel circuit 110 can express dark gray scale levels even darker.

Note that when a part of the horizontal effective scanning period is set as a light emission period, the light emission period may be placed earlier in time as illustrated in FIG. 10, may be placed later in time, or may be intermittent.

Figure 11:
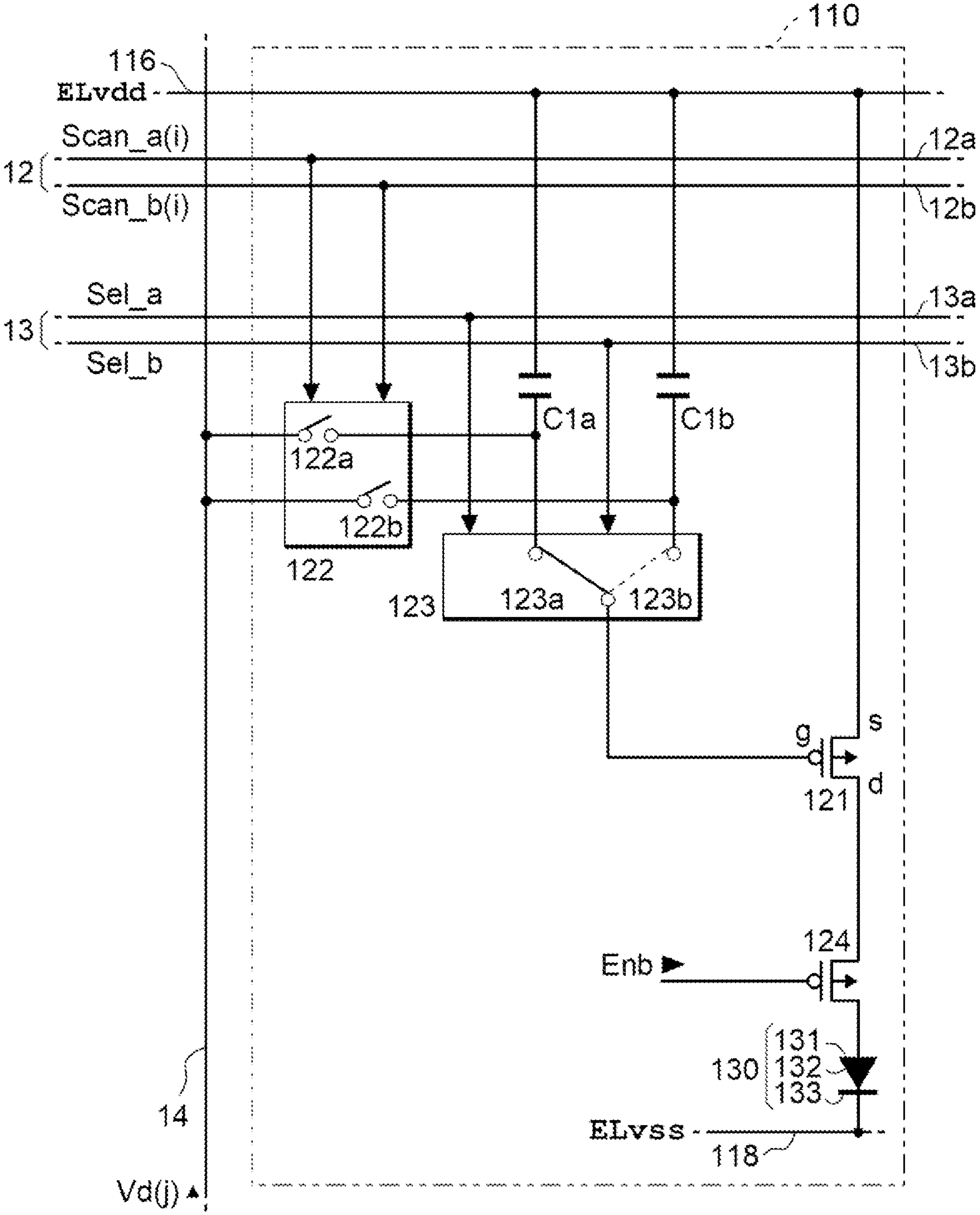
FIG. 11 is a diagram illustrating a pixel circuit of an electro-optical device according to a first embodiment.

In the first embodiment and the modified examples of the first embodiment described above, the pixel circuit 110 can be understood as having a configuration illustrated in FIG. 11.

The transistors 122*a* and 122*b* in FIG. 6 can be understood as a first selector 122 as illustrated in FIG. 11. Specifically, in the odd frame V_odd, if the scanning line 12*a* is selected and the scanning signal Scan_a(i) is brought to the L level, then the first selector 122 electrically couples one end of the capacitance element C1*a* to the data line 14 at the j-th column; and in the even frame V_eve, if the scanning line 12*b* is selected and the scanning signal Scan_b (i) is brought to the L level, then the first selector 122 electrically couples one end of the capacitance element C1*b* to the data line 14 at the j-th column.

The transistors 123*a* and 123*b* in FIG. 6 can also be understood as a second selector 123 as illustrated in FIG. 11. Specifically, in the odd frame V_odd, if the selection signal Sel_a is at the H level and the selection signal Sel_b is at the L level, then the second selector 123 electrically couples one end of the capacitance element C1*b* to the gate note g of the transistor 121; and in the even frame V_eve, if the selection signal Sel_a is at the L level and the selection signal Sel_b is at the H level, then the second selector 123 electrically couples one end of the capacitance element C1*a* to the gate node g.

In other words, the transistor 121 is an example of a drive transistor; the transistor 122*a* is an example of a first switching element; the transistor 122*b* is an example of a second switching element; the transistor 123*a* is an example of a third switching element; and the transistor 123*b* is an example of a fourth switching element. Furthermore, the capacitance element C1*a* is an example of a first capacitance element; and the capacitance element C1*b* is an example of a second capacitance element.

Second Embodiment

For the transistor 121 that controls the current flowing to the OLED 130, the threshold voltage may be compensated. Thus, a second embodiment in which the threshold voltage of the transistor 121 is compensated will be described.

Note that the second embodiment differs from the first embodiment only in the configuration of the pixel circuit 110. Thus, for the second embodiment, differences concerning the pixel circuit 110 will be mainly described.

Figure 12:
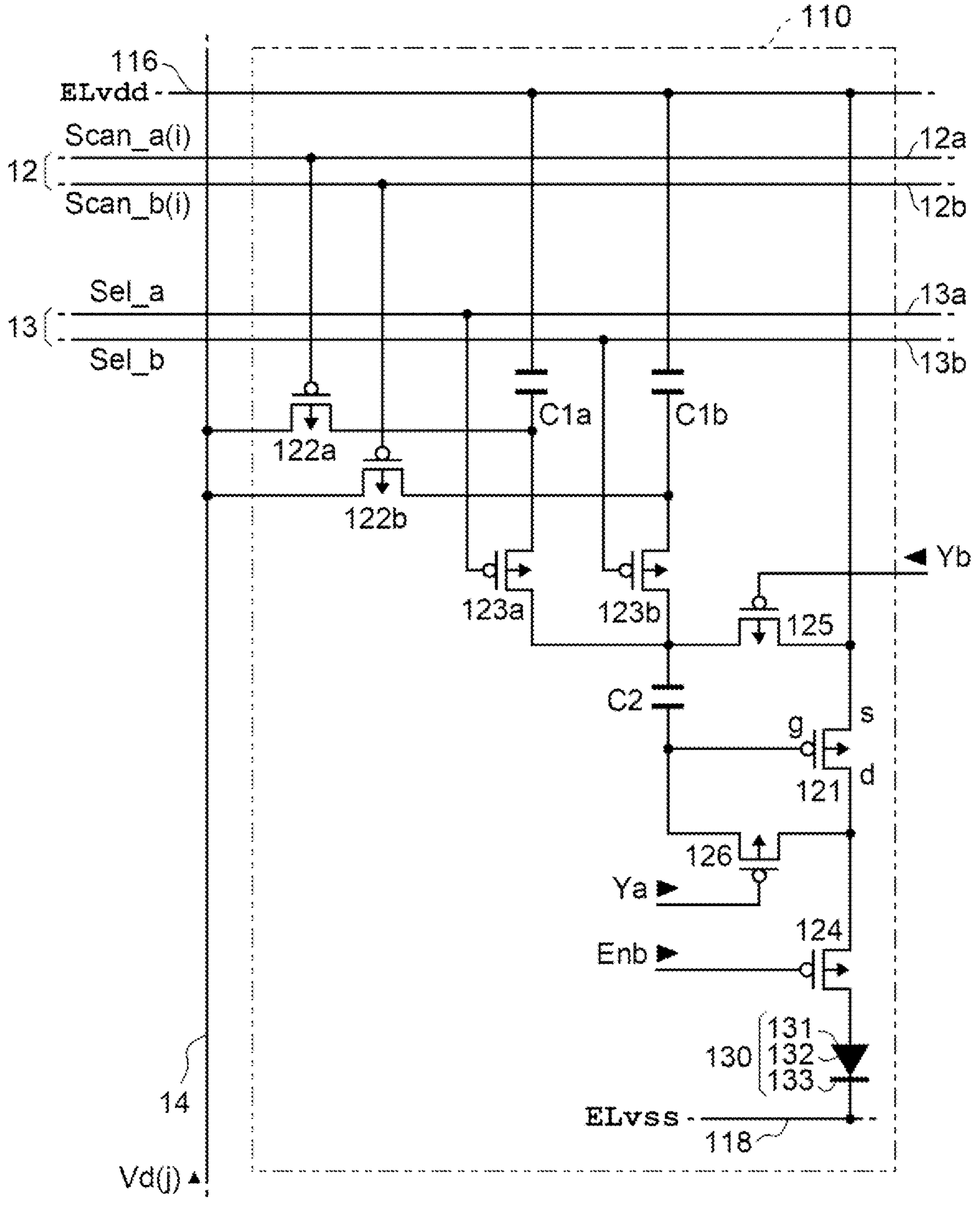
FIG. 12 is a diagram illustrating a pixel circuit of an electro-optical device according to a second embodiment.

FIG. 12 is a diagram illustrating the pixel circuit 110 in the electro-optical device 10 according to the second embodiment. In the pixel circuit 110 illustrated in FIG. 12, a capacitance element C2 and p-channel MOS type transistors 125 and 126 have been added as compared to FIG. 6.

In FIG. 12, the drain node of the transistor 123*a* and the drain node of the transistor 123*b* are coupled to the drain node of the transistor 125 and one end of the capacitance element C2. The other end of the capacitance element C2 is coupled to the gate node g of the transistor 121 and the drain node of the transistor 126. For the transistor 125, the source node is coupled to the power supply wiring 116, and a control signal Yb is supplied to the gate node. For the transistor 126, the source node is coupled to the drain node d of the transistor 121, and a control signal Ya is supplied to the gate node.

Figure 13:
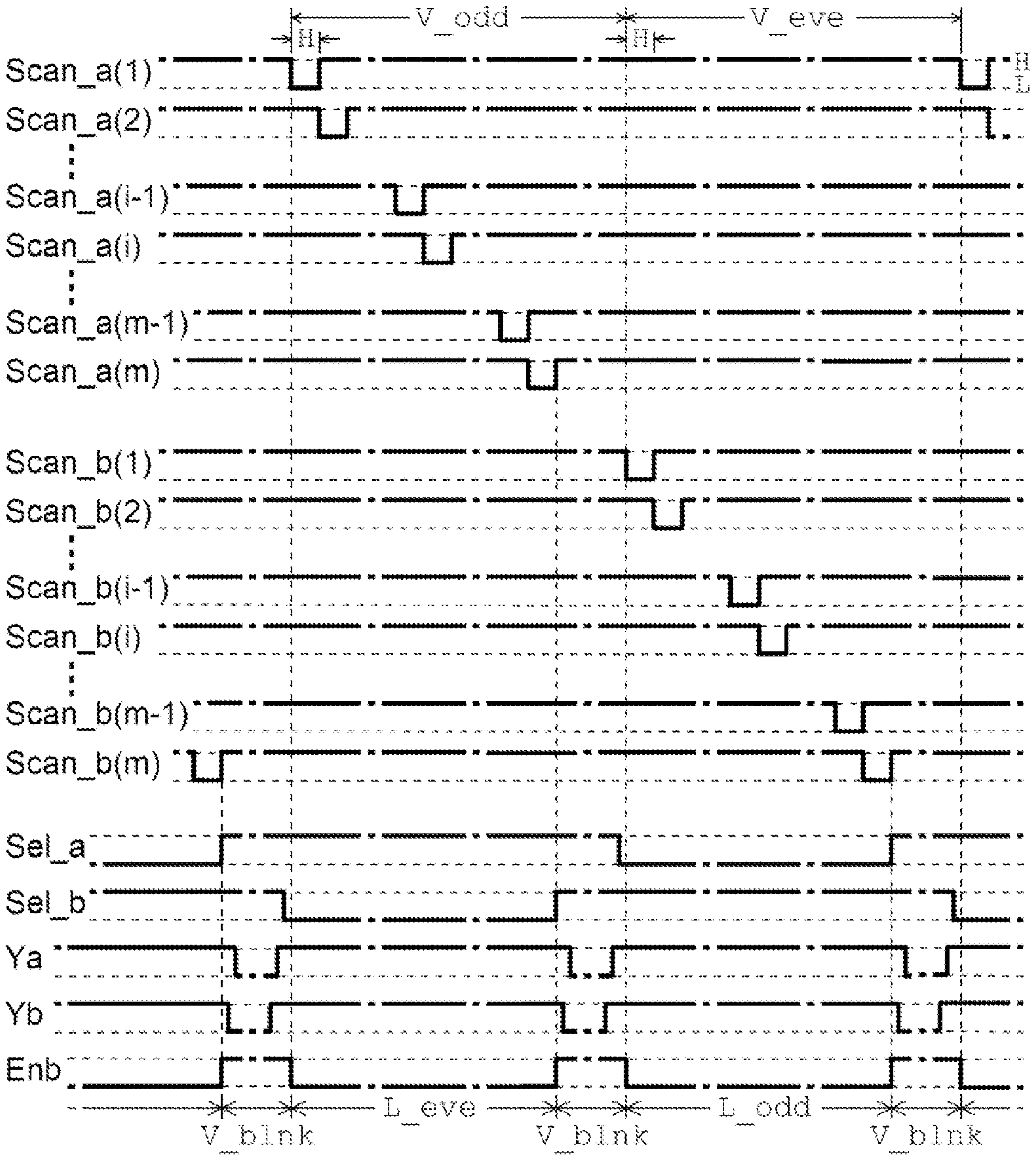
FIG. 13 is a timing chart illustrating an operation of the electro-optical device.

FIG. 13 is a timing chart for describing an operation of the electro-optical device 10 according to the second embodiment.

The control signals Ya and Yb are commonly supplied from the control circuit 30 (see FIG. 5) to all of the pixel circuits 110. As illustrated in FIG. 13, the control signals Ya and Yb are brought to the L level in the vertical scanning blanking period V_blnk. Specifically, in the vertical scanning blanking period V_blnk, the control signal Yb is brought to the L level earlier, after which the control signal Ya is brought to the L level; subsequently, the control signal Yb is brought to the H level earlier, after which the control signal Ya is brought to the H level.

Furthermore, the present embodiment is similar to the first embodiment in that the selection signal Sel_a has a phase shifted by 180 degrees from that of the selection signal Sel_b. However, the timing at which the selection signals Sel_a and Sel_b change to the H level is the start timing of the vertical scanning blanking period V_blnk, and the timing at which the selection signals Sel_a and Sel_b change to the L level is after the control signal Ya has changed to the H level and before the end of the vertical scanning blanking period V_blnk.

In the vertical scanning blanking period V_blnk, when the control signal Yb is brought to the L level, the transistor 125 is brought into the ON state, and thus one end of the capacitance element C2 is brought to the power supply potential Elvdd. Next, when the control signal Ya is brought to the L level, the transistor 126 is brought into the ON state, and thus the transistor 121 is brought into a state in which the drain node and the gate node are coupled to each other, that is, the diode coupling state. Accordingly, the voltage between the gate node g and the source node s in the transistor 121 converges to the threshold voltage of the transistor 121, and the threshold voltage is held in the capacitance element C2.

When the control signal Ya is brought to the H level, the transistor 126 is brought into the OFF state. When the control signal Yb is brought to the H level, the transistor 125 is brought into the OFF state.

After the end of the vertical scanning blanking period V_blnk, if in the light emission period L_eve, then the transistor 123*b* is brought into the ON state, and thus the capacitance elements C1*b* and C2 are brought into a state of being coupled in series between the power supply wiring 116 and the gate node g of the transistor 121. Accordingly, the threshold voltage is added to the voltage corresponding to the gray scale level supplied in the preceding even frame V_eve, and the added-up voltage is applied to the gate node g of the transistor 121.

After the end of the vertical scanning blanking period V_blnk, if in the light emission period L_odd in the even frame ✓ eve, then the transistor 123*a* is brought into the ON state, and thus the capacitance elements C1*a* and C2 are brought into a state of being coupled in series between the power supply wiring 116 and the gate node g of the transistor 121. Accordingly, the threshold voltage is added to the voltage corresponding to the gray scale level supplied in the preceding odd frame V_odd, and the added-up voltage is applied to the gate node g of the transistor 121.

Figure 14:
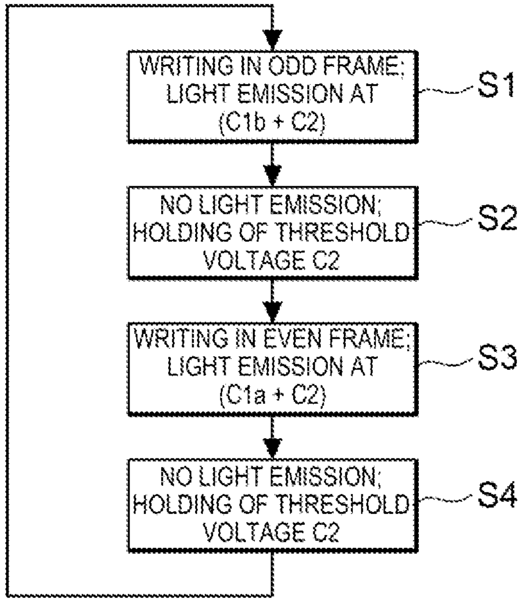
FIG. 14 is a flowchart illustrating an operation of the electro-optical device.

FIG. 14 is a flowchart illustrating an operation of the electro-optical device 10 according to the second embodiment. Here, assuming that step S1 is the operation in the light emission period L_eve of the odd frame V_odd, in step S1, the operation of causing the capacitance element C1*a* to hold the voltage of the data signal corresponding to the gray scale level in a line-sequential manner is executed in parallel with the light emission operation of causing current to flow to the OLED 130 with the threshold voltage of the transistor 121 being compensated by the voltage held in the capacitance elements C1*b* and C2.

The next step S2 is a vertical scanning blanking period V_blnk, in which the operation of causing the capacitance element C2 to hold the threshold voltage of the transistor 121 while turning off the OLED 130 is executed.

In step S3, the operation of causing the capacitance element C1*b* to hold the voltage of the data signal corresponding to the gray scale level in a line-sequential manner is executed in parallel with the light emission operation of causing current to flow to the OLED 130 with the threshold voltage of the transistor 121 being compensated by the voltage held in the capacitance elements C1*a* and C2.

The next step S4 is a vertical scanning blanking period V_blnk, in which the operation of causing the capacitance element C2 to hold the threshold voltage of the transistor 121 while turning off the OLED 130 is executed.

Thereafter, the operations of step S1, followed by S2, followed by S3, followed by S4, (followed by S1) are repeatedly executed.

According to the second embodiment, in any of the odd frame V_odd and the even frame V_eve, the transistor 121 causes current corresponding to the gray scale level to flow to the OLED 130 with the threshold voltage being compensated, enabling high-quality display with less variation among the pixel circuits 110.

Note that in the second embodiment as well, as described with reference to FIG. 10, the period for which the control signal Enb is brought to the L level may be shortened to shorten the light emission period of the OLED 130.

Figure 15:
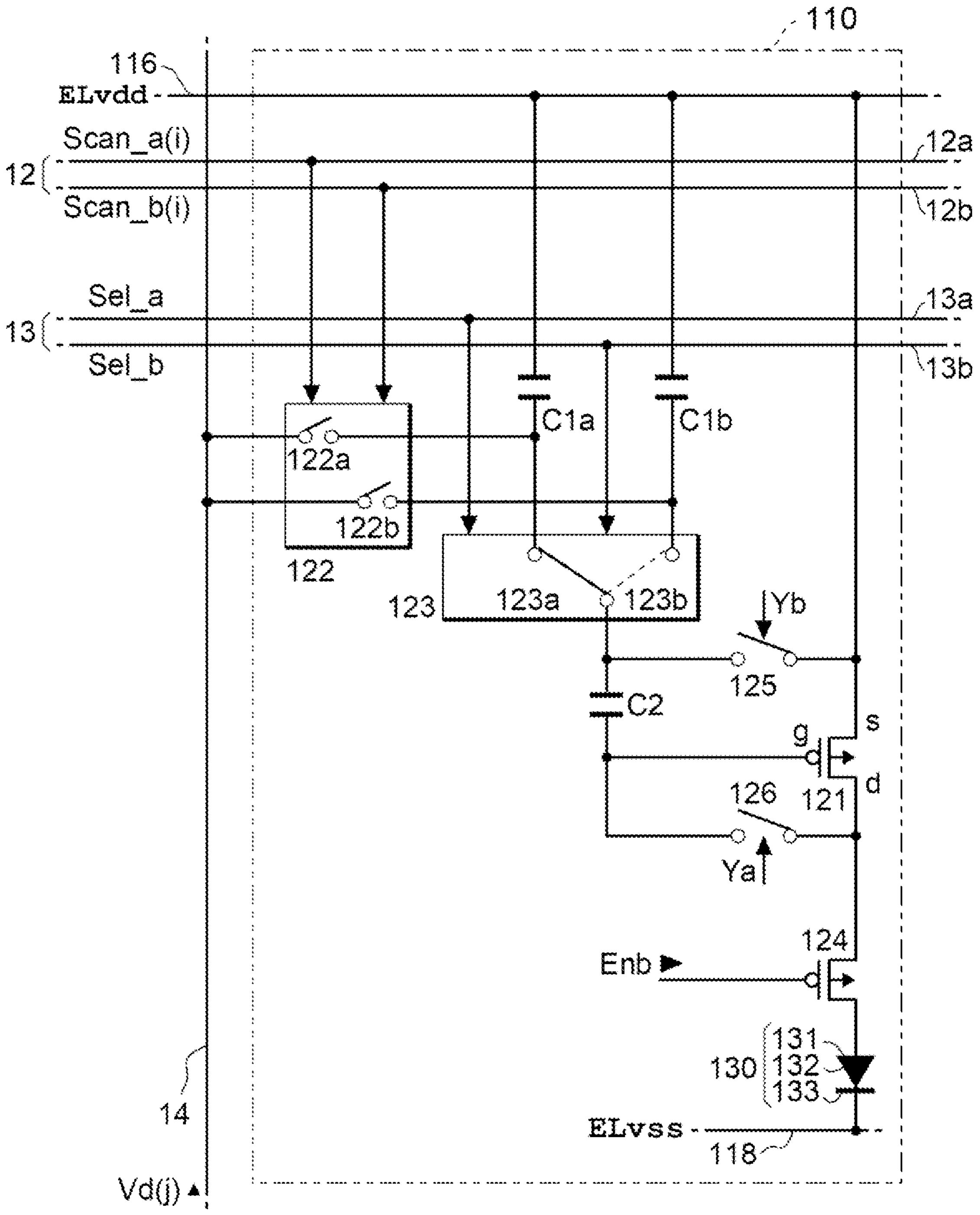
FIG. 15 is a diagram illustrating a pixel circuit in the second embodiment.

In the second embodiment described above, the pixel circuit 110 can be understood as having a configuration illustrated in FIG. 15.

As illustrated in FIG. 15, the transistor 126 in FIG. 12 functions as a switching element that, if the control signal Ya is at the L level in the vertical scanning blanking period V_blnk, electrically short-circuits the gate node g and the drain node d of the transistor 121 to bring the transistor 121 into the diode coupling state. That is, the transistor 126 is an example of a sixth switching element.

Furthermore, the capacitance element C2 holds the threshold voltage of the transistor 121 when the transistors 125 and 126 are brought into the ON state. In the odd frame V_odd, if the transistors 125 and 126 are in the OFF state, the selection signal Sel_a is at the H level, and the selection signal Sel_b is at the L level, then the capacitance element C2 holding the threshold voltage is electrically interposed between one end of the capacitance element C1*b* and the gate node g of the transistor 121; and in the even frame V_eve, if the transistors 125 and 126 are in the OFF state, the selection signal Sel_a is at the L level, and the selection signal Sel_b is at the H level, then the capacitance element C2 holding the threshold voltage is electrically interposed between one end of the capacitance element C1*a* and the gate node g of the transistor 121. That is, the capacitance element C2 is an example of a third capacitance element.

Note that "electrically interposed" in the present description refers to being inserted between two or more elements when viewed in the electrical circuit.

Applied Examples and Modified Examples

The first embodiment and the second embodiment described above (hereinafter referred to as the "Embodiments") may be applied or modified in a variety of ways. Specific modified aspects applicable to the Embodiments will be exemplified below. Two or more aspects freely selected from the exemplifications below may be combined as long as mutual contradiction does not arise.

In the electro-optical device 10 according to the Embodiments, the transistor 124 is provided between the transistor 121 and the OLED 130. However, the position at which the transistor 124 is provided is not limited to the above. The function of the transistor 124 is to block the path through which the current controlled by the transistor 121 flows to the OLED 130. Thus, it is only required that the transistors 121 and 124 are coupled in series between the power supply wiring 116 and 118. Note that the transistor 124 is an example of a fifth switching element.

In the electro-optical device 10, the transistor 124 is provided in the pixel circuit 110. In the Embodiments, however, the light emission period of the OLED 130 is common to all of the pixel circuits 110, and thus a power supply circuit (not illustrated) may supply the power supply potential ELvdd, which is supplied to the power supply wiring 116, in accordance with the light emission period.

Furthermore, while the OLED 130 has been described as an example of a light-emitting element in the Embodiments, other light-emitting elements may be used. For example, a light-emitting diode (LED), a mini LED, a micro LED, or the like may be used as a light-emitting element.

The channel types of the transistors 121, 122*a*, 122*b*, 123*a*, 123*b*, 124, 125, and 126 are not limited to those in the Embodiments. These transistors may also be each replaced with a transmission gate as appropriate except for the transistor 121.

Electronic apparatuses including the electro-optical device 10 can be applied, apart from the head-mounted display system 1, to projection systems and all apparatuses that cause the user to visually recognize the actual scene overlaid with the display image by the electro-optical device 10.

Supplementary Note

From the above description, suitable aspects of the present disclosure are understood as follows, for example. Note that to facilitate understanding of each of the aspects, the reference signs in the drawings are given in parentheses for convenience. However, this is not intended to limit the present disclosure to the aspects illustrated in the drawings.

Supplementary Note 1

An electro-optical device according to one aspect (aspect 1) includes a plurality of pixel circuits (110) provided corresponding to intersections between a data line (14) and a plurality of scanning lines (12), each of the plurality of pixel circuits (110) including a first selector (122), a second selector (123), a first capacitance element (C1*a*), a second capacitance element (C1*b*), a drive transistor (121), and a light-emitting element (130), the drive transistor (121) being configured to supply current corresponding to a voltage of a gate node (g) to the light-emitting element (130), wherein in a first frame (V_odd), the plurality of scanning lines (12) are selected sequentially, the first selector (122) in one pixel circuit (110) of the plurality of pixel circuits (110) electrically couples, if one scanning line (12) corresponding to the one pixel circuit (110) is selected, one end of the first capacitance element (C1*a*) to the data line (14), and the second selector (123) in the one pixel circuit (110) electrically couples one end of the second capacitance element (C1*b*) to the gate node (g), and in a second frame (V_eve) different from the first frame (V_odd), the plurality of scanning lines (12) are selected sequentially, the first selector (122) in the one pixel circuit (110) electrically couples, if the one scanning line (12) is selected, one end of the second capacitance element (C1*b*) to the data line (14), and the second selector (123) in the one pixel circuit (110) electrically couples one end of the first capacitance element (C1*a*) to the gate node (g).

According to the aspect 1, in the first frame (V_odd), the potential of the data line (14) is held in the first capacitance element (C1*a*) in a line-sequential manner; and in the second frame (V_eve), one end of the first capacitance element (C1*a*) is coupled to the gate node (g) of the drive transistor (121), and thus the OLEDs (130) are simultaneously turned on. That is, after the line-sequential holding operation in the first frame (V_odd), the light-emitting elements (130) can simultaneously emit light based on the held voltage in the second frame (V_eve).

Therefore, according to the aspect 1, a long light emission period can be secured without accelerating the line-sequential holding operation. Furthermore, since light-emitting elements (130) can simultaneously emit light, the display image can be prevented from being visually recognized with distortion due to the line-sequential light emission.

Supplementary Note 2

In the electro-optical device (10) according to a specific aspect (aspect 2) of the aspect 1, the first selector (122) includes a first switching element (122*a*) that is brought into an ON state or an OFF state between the data line (14) and one end of the first capacitance element (C1*a*) and a second switching element (122*b*) that is brought into an ON state or an OFF state between the data line (14) and one end of the second capacitance element (C1*b*) and the second selector (123) includes a third switching element (123*a*) that is brought into an ON state or an OFF state between one end of the first capacitance element (C1*a*) and the gate node (g) and a fourth switching element (123*b*) that is brought into an ON state or an OFF state between one end of the second capacitance element (C1*b*) and the gate node (g). According to the aspect 2, the first selector (122) and the second selector (123) can be specifically configured.

Supplementary Note 3

In the electro-optical device (10) according to a specific aspect (aspect 3) of the aspect 2, the pixel circuit (110) includes, between higher power supply wiring (116) and lower power supply wiring (118), a fifth switching element (124) coupled in series to the drive transistor (121). According to the aspect 3, the drive transistor (121) can supply current corresponding to the potential of the gate node (g) to the light-emitting element (130) by the ON state of the fifth switching element (124).

Supplementary Note 4

In the electro-optical device (10) according to a specific aspect (aspect 4) of the aspect 2 or 3, the pixel circuit (110) includes a third capacitance element (C2) configured to hold a threshold voltage of the drive transistor (121) and the third capacitance element (C2) is interposed, in the first frame (V_odd), between one end of the second capacitance element (C1*b*) and the gate node (g), and is interposed, in the second frame (V_eve), between one end of the second capacitance element (C2) and the gate node (g). According to the aspect 4, the threshold voltage of the drive transistor (121) can be compensated.

Supplementary Note 5

In the electro-optical device (10) according to a specific aspect (aspect 5) of the aspect 4, the pixel circuit (110) includes a sixth switching element (126) configured to bring the drive transistor (121) into a diode coupling state. According to the aspect 5, the compensation of the threshold voltage in the drive transistor (121) can be specifically configured.

Supplementary Note 6

In the electro-optical device (10) according to a specific aspect (aspect 6) of the aspect 3, 4, or 5, the fifth switching element (124) is brought into an ON state in all or a part of a period (L_odd or L_eve) in which the plurality of scanning lines (12) are selected one by one sequentially. According to the aspect 6, the light emission period for which current flows to the OLED 130 can be controlled. Specifically, lengthening the light emission period can ensure the brightness of the display image, and shortening the light emission period can reduce a sense of blurring in the display of moving image.

Supplementary Note 7

An electronic apparatus according to a specific aspect (aspect 7) of any of the aspect 1 to 6 includes an electro-optical device according to any of the above aspects. According to the aspect 7, a long light emission period can be secured without accelerating the line-sequential holding operation, and the image can be prevented from being visually recognized with distortion.

What is claimed is:

1. An electro-optical device comprising a data line;

a plurality of scanning lines including a first scanning line and a second scanning line;

a plurality of first control lines;

a plurality of second control lines;

a plurality of pixel circuits provided corresponding to intersections between the data line and the plurality of scanning lines, each of the plurality of pixel circuits including a first selector, a second selector, a first capacitance element, a second capacitance element, a drive transistor, and a light-emitting element;

the drive transistor being configured to supply, to the light-emitting element, a current corresponding to a voltage of a gate node, wherein in a first frame, the plurality of scanning lines are selected sequentially, the first selector in one pixel circuit of the plurality of pixel circuits electrically couples, when the second scanning line corresponding to the one pixel circuit is selected, one end of the first capacitance element to the data line, and the second selector in the one pixel circuit electrically couples one end of the second capacitance element to the gate node in accordance with a first control signal supplied via at least one of the first control lines, and in a second frame different from the first frame, the plurality of scanning lines are selected sequentially, the first selector in the one pixel circuit electrically couples, when the first scanning line corresponding to the one pixel circuit is selected, one end of the second capacitance element to the data line, and the second selector in the one pixel circuit electrically couples one end of the first capacitance element to the gate node in accordance with a second control signal supplied via at least one of the second control lines.

2. The electro-optical device according to claim 1, wherein the first selector includes:

a first switching element that is brought into an ON state or an OFF state between the data line and one end of the first capacitance element; and a second switching element that is brought into an ON state or an OFF state between the data line and one end of the second capacitance element, and the second selector includes:

a third switching element that is brought into an ON state or an OFF state between one end of the first capacitance element and the gate node in accordance with the first control signal; and a fourth switching element that is brought into an ON state or an OFF state between one end of the second capacitance element and the gate node in accordance with the second control signal.

3. The electro-optical device according to claim 2, further comprising:

a higher power supply wiring, and a lower power supply wiring, wherein the pixel circuit includes a fifth switching element, and the fifth switching element and the drive transistor are coupled in series between the higher power supply wiring and the lower power supply wiring.

4. The electro-optical device according to claim 3, wherein the fifth switching element is brought into an ON state in all or a part of a period in which the plurality of scanning lines are selected one by one sequentially.

5. The electro-optical device according to claim 2, wherein the pixel circuit includes a third capacitance element configured to hold a threshold voltage of the drive transistor and the third capacitance element is interposed, in the first frame, between one end of the second capacitance element and the gate node, and is interposed, in the second frame, between one end of the first capacitance element and the gate node.

6. The electro-optical device according to claim 5, wherein the pixel circuit includes a sixth switching element configured to bring the drive transistor into a diode coupling state.

7. An electronic apparatus comprising the electro-optical device according to claim 1.

* * * * *